July 5, 1966 R. P. PAPENGUTH 3,259,404
SEALED JOINT AND GASKET THEREFOR
Filed Oct. 23, 1963 2 Sheets-Sheet 1

INVENTOR.
RICHARD P. PAPENGUTH
BY
John N. Wolfram
ATTORNEY

July 5, 1966   R. P. PAPENGUTH   3,259,404
SEALED JOINT AND GASKET THEREFOR
Filed Oct. 23, 1963   2 Sheets-Sheet 2

INVENTOR.
RICHARD P. PAPENGUTH
BY
John N. Wolfram
ATTORNEY

United States Patent Office 3,259,404
Patented July 5, 1966

3,259,404
SEALED JOINT AND GASKET THEREFOR
Richard P. Papenguth, Venice, Calif., assignor to Parker-Hannifin Corporation, Cleveland, Ohio, a corporation of Ohio
Filed Oct. 23, 1963, Ser. No. 318,320
5 Claims. (Cl. 285—212)

This invention relates to sealed threaded joints and to a gasket for accomplishing the seal.

In order to seal against leakage of fluid past a threaded member, it is necessary to seal both against axial leakage past the crests of the thread and against spiral leakage within the groove between the thread flanks. In the past, attempts have been made to provide such sealing by either distorting a deformable gasket against the crests and within the thread groove from a position outside of the groove or by providing a thread form on the gasket to initially fit within the thread groove over a distance greater than one turn of the thread and compressing the thread form of the gasket against the threaded member.

In the first of these methods the great amount of distortion required to flow the gasket material into the thread groove makes it difficult to completely fill the groove for preventing spiral leakage and also results in damaging of the gasket to the extent that it can seldom be used for more than one makeup of the joint.

In the second method, providing a thread form on the gasket is not only more expensive but also requires that the gasket be threaded on and off the member to be sealed, thus requiring more time for making and disassembling the joint.

The present invention has as an object the overcoming of these disadvantages and accomplishes this by providing a gasket which has a circular surface for sealing the thread crests throughout more than one turn and which has one or more radial projections which initially project into the thread groove so as to require very little deformation to seal the groove against spiral leakage, the projections being so spaced circumferentially that one or more projections will be within the overlap section of the crest contact regardless of the rotative position on the thread. Moreover, the projections are readily bendable so that the gasket can be assembled over the thread without turning.

Figures 1, 4:
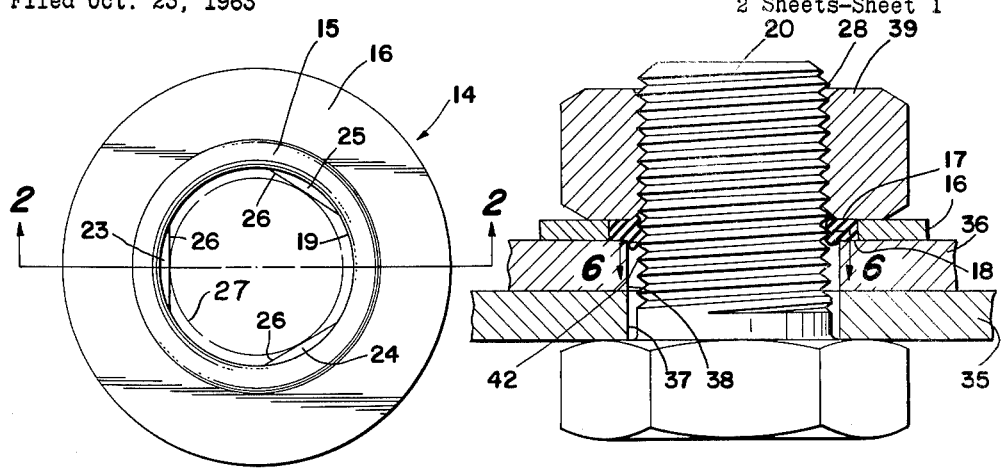
Figure 2:
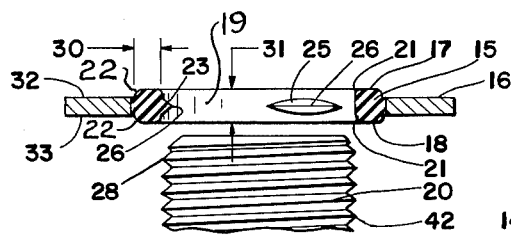
Figure 5:
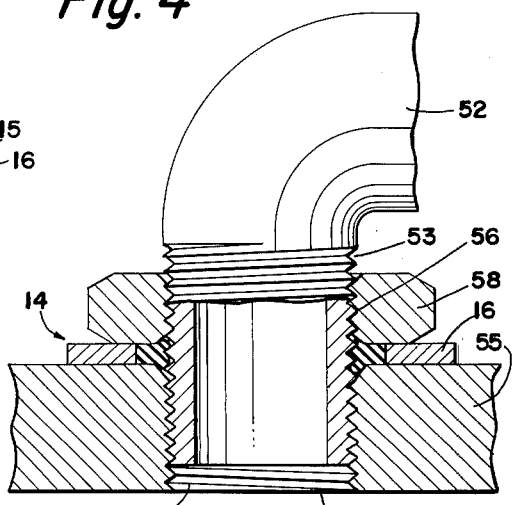
Figure 3:
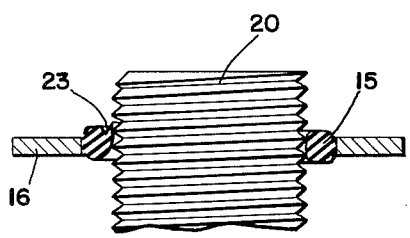
Figure 6:
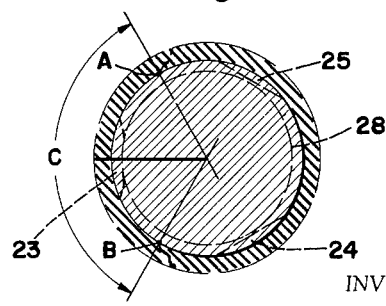
Figure 7:
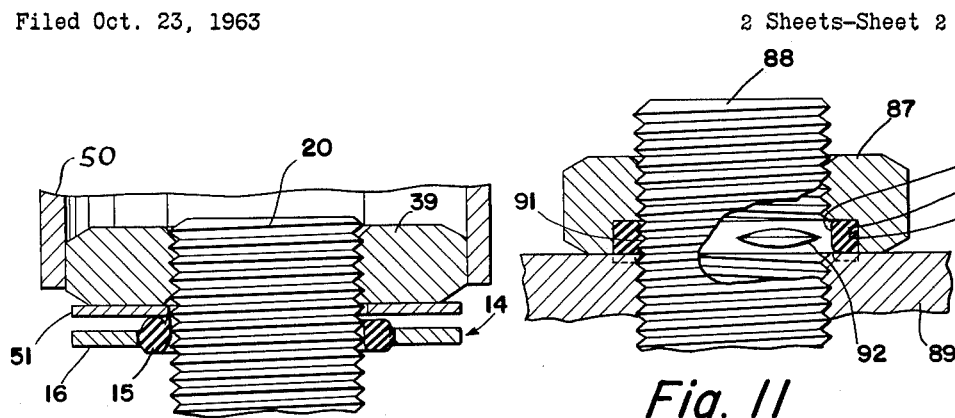
Figure 11:
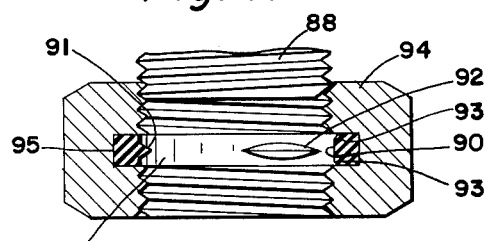
Figure 8:
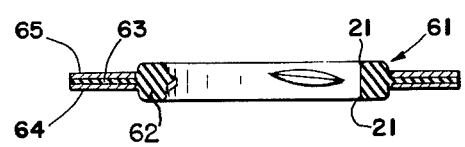
Figure 12:
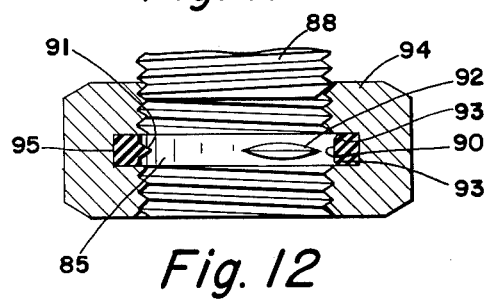
Figure 9:
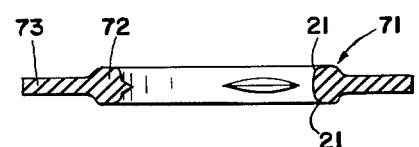
Figure 13:
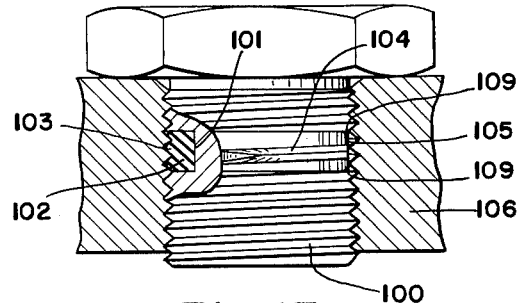
Figure 10:
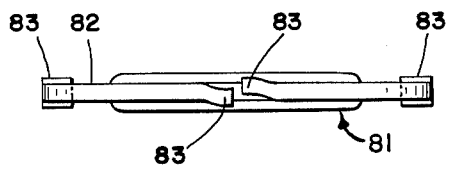
Figure 14:
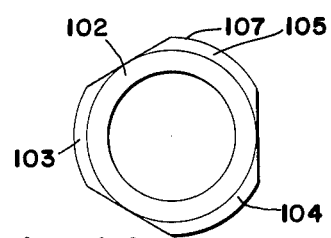

Other objects of the invention will be apparent from the following description and from the drawings in which:

FIGURE 1 is a plan view of one form of the sealing gasket,

FIGURE 2 is a cross-section view along the lines 2—2 of FIGURE 1 and showing the gasket in position for insertion over a threaded member, FIGURE 3 is a view corresponding to FIGURE 2 except showing the gasket inserted over the threaded member, FIGURE 4 is a cross-section view of the gasket assembled in one form of joint, FIGURE 5 is a cross-section view of the gasket assembled in another form of joint, FIGURE 6 is a cross section view in a right helicoid through the thread crest as approximately indicated at 6—6 in FIGURE 4, FIGURE 7 is a fragmentary cross-section view of another form of the invention for accommodating assembly by means of a power wrench, FIGURES 8 and 9 are cross-section views of optional forms of the gasket, FIGURE 10 is a side view of still another form of the gasket, FIGURE 11 is a cross section of a modified form of the invention in which the gasket is mounted in a rabbet formed in a threaded nut, FIGURE 12 is a cross section showing the gasket mounted within an internal groove in a threaded nut, FIGURE 13 is a cross section showing a modified form of the gasket mounted on an externally threaded member, and FIGURE 14 is a plan view of the gasket of FIGURE 13.

Gasket 14 shown in FIGURES 1 through 7 has an inner ring 15 of deformable and resilient material such as rubber, synthetic rubber, synthetic resin, or the like. Inner ring 15 is surrounded by an outer ring 16 of rigid material such as metal or hard plastic and to which it is preferably attached by bonding.

Inner ring 15 has a pair of annular flat sealing end faces 17, 18 which project axially beyond ring 16. It also has a circular bore or opening 19 therethrough which is of an initial diameter slightly larger than the major diameter of the threads on member 20. Extending radially inwardly from the wall of opening 19, and equally angularly spaced on such wall, are three projections 23, 24 and 25. The inner edge 26 of each of these projections is preferably a straight line, as illustrated in FIGURE 1. On gaskets for use with V-shaped threads as shown on member 20, the cross section of each projection in all radial planes is substantially an equilateral triangle with one of the sides of the triangle being an imaginary line where the projection joins or intersects the wall of opening 19.

The projections are of such size that a circle 27 tangent to the radially innermost part of edges 26, as shown in FIGURE 1, has a diameter substantially the same as or somewhat smaller than the root diameter of threads 28 of member 20 so that the initial cross section area of each projection at its midpoint is about the same or somewhat greater than that of the thread groove. Edges 26 lie in a plane which is normal to the central axis of opening 19 and which is parallel with faces 32, 33 of outer ring 16.

On gaskets for use with other than V-shaped threads, the cross section of the projections in at least one radial plane is preferably the same in shape and either the same or somewhat larger than the thread groove cross section.

The thickness of outer ring 16 and the length of cylindrical opening 19 between rounded inner corners 21 are each about the same as or somewhat greater than the pitch of thread 28. Corners 21 are rounded to facilitate passing the gasket over thread 28 as shown in FIGURE 3. Outer corners 22 are likewise rounded and spaced radially inwardly of the inner diameter of ring 16 to prevent pinching of the rubber between ring 16 and the parts with which the gasket is assembled.

The resilient inner ring 15 and its projections 23, 24, 25 are sufficiently flexible so that they will bend and deform as indicated in FIGURE 3 to permit the gasket to be inserted over threaded member 20 by simply pushing the gasket thereover and without turning or threading the gasket upon member 20.

Threaded member 20 may, for example, be in the form of a bolt to be used for clamping an inner liner 35 of a tank or other fluid containing device to an outer liner 36, the liners 35, 36 having openings 37, 38 therethrough for receiving bolt 20, as shown in FIGURE 4.

In this instance, gasket 14 is clamped against the outer liner 36 by a nut 39 threaded onto the bolt. In the tightly assembled position illustrated in FIGURE 4, the end faces 17, 18 of the gasket have been deformed by contact with nut 39 and liner 36, respectively, and outer ring 16 has been engaged by these members to limit further deformation of inner ring 15. Contact of gasket face 18 with liner 36 establishes a seal between these parts.

During the clamping action, inner ring 15, whose initial thickness 31 between faces 17, 18 is preferably at least one and one-half times greater than the pitch of the thread 28, is distorted radially inwardly into sealing contact with crest 42 of thread 28 throughout more than one turn of the thread, or in other words, in excess of 360 degrees. This is shown in FIGURE 6 in which point A illustrates an initial point of sealing contact of inner ring 15 against thread crest 42 and B illustrates the last point of contact approximately 1⅓ turns beyond point A. Inner ring 15 is thus in contact with two adjacent crest portions so that the crest contact overlaps throughout angular distance C.

When the parts are ideally located, one of the projections 24 is centrally located within the overlap area and is positioned between the crests in substantial axial alignment with the thread groove, the projection being deformed radially inward so that a portion of the projection completely fills the thread groove cross section so as to be in sealing contact with the flanks and root of the thread groove over a substantial circumferential distance, as illustrated in FIGURE 6. With this arrangement, the contact of the inner ring 15 with the thread crest for more than 360 degrees prevents leakage of fluid in an axial direction past the thread crests and the contact of projection 24 with the flanks and root in the overlap area prevents spiral leakage along the thread groove.

The remaining projections 24, 25 may or may not fill the opposed thread groove portion, depending upon the condition of alignment with the thread groove portion, the amount of deformation of ring 15, and other factors. However, it is immaterial whether these projections fill the thread groove while they are outside of the overlap area since they are nevertheless ineffective for preventing leakage.

By having approximately 120 degrees or more overlap of thread crest contact with ring 15 when there are three equally angularly spaced projections 23, 24 and 25, it is always certain that at least one, or portions of two, projections will be within the overlap area for sealing against spiral leakage. If desired, a greater number of projections may be provided, in which case the extent of crest contact overlap may be correspondingly reduced.

In the form of joint shown in FIGURE 5, 52 is an elbow tube or pipe fitting having one leg 53 threadably engaged in an opening 54 of a member 55. The latter may be a part of any device for receiving fluid, such as a tank, pump housing, valve body, or the like. Threads 56, 57 may be either straight or tapered. In this instance, fitting 52 is threaded into member 55 to any desired angular position while nut 58 is in an upper position on thread 56. Nut 58 is then threaded down upon gasket 14 to clamp the latter into sealing engagement with member 55 and thread 56 in the same manner as described in connection with FIGURE 4.

In some instances it may be desirable to advance gasket 14 and nut 39 over bolt 20 with a power wrench 50 at great speed, in which case it has been found that a thin washer 51 of metal or hard plastic disposed between gasket 14 and nut 39 will give backing to inner ring 15 to prevent damage thereto due to the fast passage over the bolt and will also absorb the turning friction of the nut 39 so that there is less tendency for the gasket 14 to turn, with consequent less chance of damaging the projections. Since the fluid becomes sealed off by the gasket 14 before it can reach either washer 51 or nut 39, there is no possibility of leakage between the washer and nut.

In the form of gasket shown in FIGURE 8, the inner ring 62 of deformable material has a thin outer flange 63 and there are a pair of annular metal washers 64, 65 on either side of the flange. When this form of gasket is tightened into position in a joint, pressure of the metal washers 64, 65 on flange 63 will cause some of the material of the latter to be displaced radially inwardly to contribute an additional volume of resilient material to the inner portion 62 being deformed against the surfaces being sealed.

In the FIGURE 8 form, the projections are shown as being on a helix corresponding to that of the thread to be sealed, although the projections may, if desired, be in a plane as in FIGURE 2. This helical arrangement may be used in all of the other forms of the gasket and has the advantage that all three projections can be aligned with the thread groove upon rotation of the gasket after it has been inserted over the threaded member. Obviously, a gasket with the helical projections may also be threaded onto member 20.

In the FIGURE 9 form, the entire gasket 71 is made of resilient or rubber-like material, the gasket having substantially the same outline and dimensions of the combined inner and outer rings 15, 16 shown in FIGURES 1 through 7. In this case the outer portion 73, which is thinner in axial thickness than the inner portion 72, serves to substantially limit further tightening of the joint when contacted by opposed faces on the nut and body member but further tightening can be accomplished by applying additional torque to the nut. In the latter case, material from flange 73 will also be deformed radially inwardly to assist in making the seal.

FIGURE 10 shows still another form of gasket 81 in which the outer ring 82 has a series of bent prongs 83 for locking against the adjacent surfaces of the nut and body member with which the gasket is assembled.

In the form of the invention shown in FIGURE 11, gasket 85 is mounted within a rabbet 86 in nut 87, the gasket being preferably bonded to the nut, although this is not absolutely essential. The gasket is initially of a thickness greater than the depth of the rabbet, as indicated by the dotted line, so that when the nut is threaded to member 88, the gasket will make sealing contact with the upper face of member 89 and be distorted radially inwardly so that the inner circular face 90 of the gasket will make good sealing contact with the crest of the thread upon member 88 for more than one turn of the thread. The depth of rabbet 86 and the axial thickness of gasket 85 is greater than the distance between such thread crests to permit such contact for more than a full turn. The initial diameter of surface 90 may, if desired, be slightly less than the diameter of the thread crest on member 88 to further assure such contact.

Gasket 85 has a plurality of projections, two of which are shown at 91, 92 extending radially inward from surface 90. These projections have the same cross section as those in FIGURE 2. They are preferably on a helix which is a continuation of the helix of the thread in nut 87 so that the projections will be properly aligned to fit within the groove of the thread on member 88 when the nut is threaded onto the latter. However, the projections may be in a plane normal to the axis of the nut, if desired.

When nut 87 is threaded tightly against member 89, gasket 85 will be deformed so that at least one of the projections will be in tight sealing contact with member 88 in the region where contact of the gasket with the crests of the thread on member 88 overlaps so as to seal against spiral leakage.

If desired, gasket 85 may be loose with respect to nut 87 so that it can be separately inserted over member 88, in which case it may be so inserted by axial motion rather than by turning. In such case, the projections bend so as to pass over the threads.

FIGURE 12 shows a nut 94 having an internal groove 95 in which a gasket 85 corresponding to the gasket in FIGURE 11 is mounted and preferably bonded into place. In this instance, since there is no axial deformation of gasket 85 when the parts are threaded together, the inner diameter 90 must be of an initial diameter smaller than the crest diameter of the thread on member 88 so as to establish sealing contact with the crest throughout more than one turn upon the threading of member 88 into nut 94 and the cross section of each projection is somewhat larger in at least one radial plane than the cross section of the thread groove to provide tight sealing contact therewith. In FIGURE 12, as in FIGURE 11, the initial thickness of gasket 85 is greater than the distance between the crests of the thread.

FIGURE 13 shows the invention as applied to an externally threaded member. In this form, threaded bolt 100 has an external annular groove 101 in which annular gasket 102 is mounted and preferably bonded into place. The gasket has a plurality of longitudinally spaced projections 103, 104 and 105, as shown in FIGURE 14. These projections in cross section have the shape of the cross section of the thread form and may be on a helix corresponding to and in alignment with the thread of member 100, or they may lie in a plane normal to the axis of the bolt. The outer surface 105 of the gasket is of a diameter slightly larger than the root diameter of the threads in member 106 and the gasket is of an axial thickness greater than the distance between thread crests so that surface 105 will make sealing contact with the internal crests of member 106 throughout more than one turn. Similarly, the cross section area of each projection in at least one radial plane is initially greater than that of the thread groove. One or more of the projections will be located in the overlap portion of such crest contact and fill the thread valley to seal against spiral leakage.

If desired, groove 101 may be in the form of a rabbet at the lower end of bolt 100 and may project slightly beyond the end of the bolt so as to be compressible by a member, not shown, at the end of the bolt for deforming the gasket into tight sealing contact with the threaded portion of member 106.

Corners 93 of FIGURES 11 and 12 and corners 109 of the gasket in FIGURE 13 are rounded for the same reason as corners 21 in FIGURE 2.

Many other modifications of the invention may be made and it is not intended that the claims be limited to the particular forms shown and described.

I claim:

1. In a joint, a pair of threadedly engaged members exposed to a fluid, an annular gasket sealingly engaging one of said members and having a circular surface of a width greater than the pitch of the thread on the other member but less than twice such pitch for engaging the crests of the thread on said other member throughout a circumferential arc in excess of 360° but less than 720° whereby there is a section of circumferential overlap of said engaged crests and whereby axial leakage of fluid past said engaged crests is prevented, said gasket having a plurality of resiliently deformable projection means circumferentially spaced about said surface and extending radially therefrom, such circumferential spacing being no greater than the circumferential length of said overlap section whereby there will be at least a portion of one of said projection means within the overlap section regardless of the angular orientation of said gasket relative to the threads on said other member, said portion of said one projection means extending into the groove of the thread on said other member between said crests to fill the same and sealingly engage the flanks and root thereof to prevent spiral leakage of fluid therealong, said projection means being relatively thin and having an angular length sufficiently less than 360° to permit ready flexing of said projection means for ease of assembly of said gasket and said one member by pushing without turning.

2. The joint of claim 1 wherein said projection means have an angular length of less than 180° and a cross section in at least one radial plane substantially identical to the cross section of the thread groove of said other member.

3. The joint of claim 1 wherein said annular gasket has inner and outer generally circular surfaces and axial end faces, and said plurality of resiliently deformable projection means extend radially inwardly from said inner circular surface, said projection means having a cross section substantially the same in shape and size as the cross section of the thread groove of said other member, the maximum axial thickness of said projection means being less than the axial thickness of said gasket between said faces, the inner edges of said projection means initially lying in substantially a straight line whereby said projection means have a maximum radial dimension approximately midway between the circumferential ends of said projection means, the minimum radial distance from the axis of said gasket to said edges of said projection means being substantially the same as the radius of the root of the thread of said other member, said gasket having an outer flange axially inwardly offset from said faces and providing said outer circular surface, the diameter of said inner surface being slightly greater than the major diameter of the thread of said other member and the axial thickness of said gasket between said faces being greater than the radial thickness of said gasket between said surfaces, the thickness of said gasket between said faces being greater than the distance between crests of the thread of said other member, a washer of rigid material surrounding said gasket and bonded to said outer surface, said washer having the same thickness as said outer flange, and means for forcing said gasket against said one member whereby one of said faces engages in sealing contact therewith and the inner surface of said gasket sealingly engages the crests of the thread of said other member throughout more than one turn whereby there is an overlapping section of said crest sealing contact as aforesaid.

4. The joint of claim 1 wherein the edges of said projection means remote from said surface are substantially straight lines, approximately tangent to the root diameter of said thread.

5. The joint of claim 1 wherein said gasket is mounted in a groove in said one member, said gasket initially having a thickness greater than the depth of said groove, and there is still another member surrounding said other member against which said gasket is deformed to make sealing contact therewith and to force said gasket radially into sealing engagement with the crests of the thread of said other member as aforesaid.

References Cited by the Examiner

UNITED STATES PATENTS

| | | | |
|---|---|---|---|
| 2,672,069 | 3/1954 | Mitchell | 85—1 |
| 2,706,656 | 4/1955 | Roubal | 85—50 X |
| 2,761,347 | 9/1956 | McKee | 85—50 X |
| 2,765,834 | 10/1956 | Poupitch | 85—50 X |
| 2,895,367 | 7/1959 | Nagy | 85—1 |
| 2,919,147 | 12/1959 | Nenzell | 285—347 X |
| 2,960,353 | 11/1960 | Woodling | 285—212 X |
| 2,982,573 | 5/1961 | McKee | 85—1 X |
| 2,983,534 | 5/1961 | Heller | 85—1 X |
| 3,009,722 | 11/1961 | Augustin | 85—1 X |
| 3,062,557 | 11/1962 | Underwood. | |

FOREIGN PATENTS

| | | |
|---|---|---|
| 1,226,676 | 2/1960 | France. |
| 537,654 | 7/1941 | Great Britain. |
| 836,197 | 6/1960 | Great Britain. |
| 866,922 | 5/1961 | Great Britain. |

CARL W. TOMLIN, *Primary Examiner.*

C. B. FAGAN, *Assistant Examiner.*